United States Patent
Ourchane et al.

(10) Patent No.: US 6,439,653 B1
(45) Date of Patent: Aug. 27, 2002

(54) MOUNTING STRUCTURE WITH IMPROVED STIFFNESS CHARACTERISTICS

(75) Inventors: Amar Ourchane, Dearborn; Ching-Hung Chuang, Northville; Ronald Machin, Ann Arbor; Scott Crane, Farmington Hills; Xiao Wu, Canton, all of MI (US)

(73) Assignee: FOrd Global tech., Inc., Dearborn, MI (US)

( * ) Notice: Subject to any disclaimer, the term of this patent is extended or adjusted under 35 U.S.C. 154(b) by 0 days.

(21) Appl. No.: 09/604,587

(22) Filed: Jun. 27, 2000

(51) Int. Cl.⁷ ................................................ B60R 27/00
(52) U.S. Cl. ................. 296/202; 276/187; 276/203.03; 276/29
(58) Field of Search ................ 296/187, 202, 296/203.03, 29, 30, 188, 189

(56) References Cited

U.S. PATENT DOCUMENTS

| 4,909,567 A | | 3/1990 | Naganuma |
| 5,094,034 A | * | 3/1992 | Freeman ..................... 296/189 |
| 5,518,290 A | | 5/1996 | Reinhard et al. |
| 5,556,673 A | | 9/1996 | Giraud |
| 5,624,150 A | * | 4/1997 | Venier ................... 296/146.11 |
| 5,653,496 A | * | 8/1997 | Mori et al. .................. 296/189 |
| 6,000,748 A | * | 12/1999 | Tomforde et al. ............. 296/29 |
| 6,003,934 A | * | 12/1999 | Usui ........................... 296/189 |
| 6,139,093 A | * | 10/2000 | Elliott et al. .................. 296/30 |

FOREIGN PATENT DOCUMENTS

| DE | 3717428 A1 | 12/1987 | |
| DE | 3435778 C2 | 3/1996 | |
| EP | 208020 B2 | 12/1985 | |
| EP | 642940 B1 | 8/1994 | |
| JP | 362020715 A | * 1/1987 | ................. 49/502 |
| JP | 01067417 A | * 3/1989 | ................. 49/502 |

* cited by examiner

*Primary Examiner*—D. Glenn Dayoan
*Assistant Examiner*—Hilary Gutman
(74) *Attorney, Agent, or Firm*—Ford Global Tech., Inc.

(57) ABSTRACT

A mounting structure 10 having improved stiffness characteristics. The mounting structure 10 includes a pillar 14 which forms a portion of a vehicle body 12 and which operatively supports a vehicle door which is selectively attached to the pillar 14 by hinges 16. The structure 10 includes a pair of "closed-loop" beads which are formed around hinges 16, and which increase the stiffness characteristics of the pillar 14 and of the vehicle door.

16 Claims, 2 Drawing Sheets

| Desciptions | Drop Off @ Beltline | Sag Def @ Beltline | Full Open Twist @ (Tip-Bottom) |
|---|---|---|---|
| Door Mounted to Pillar with no Beads | 4.446mm | 31.66mm | 54.7mm |
| Door Mounted to Pillar with Horizonal Beads | 4.272mm (-4%) | 30.42mm (-4%) | 50.6mm (-7.5%) |
| Door Mounted to Pillar with Closed Loop Beads | 3.923mm (-11%) | 27.95mm (-11%) | 45.6mm (-16.6%) |

MOUNTING STRUCTURE WITH IMPROVED STIFFNESS CHARACTERISTICS

(1) FIELD OF THE INVENTION

This invention relates to a mounting structure with improved stiffness characteristics, and more particularly, to a structure on which a component, such as a vehicle door, may be selectively mounted and a method for increasing the stiffness of the structure.

(2) BACKGROUND OF THE INVENTION

Mounting structures are used and/or formed on various assemblies, such as automotive vehicles, to provide support to components which are selectively mounted to the assemblies. For example and without limitation, automotive vehicles include mounting structures or portions of the vehicle body or frame on which components, such as vehicle doors, liftgates or hoods, are typically and selectively mounted.

One type of mounting structure, commonly referred to as a "pillar", is a portion of the vehicle frame or body which is used to mount and support a vehicle door. Particularly, a hinge member is typically fixedly and rigidly coupled to the pillar and to the vehicle door, and allows the door to be operatively supported by the pillar and to be pivotally movable between an opened and closed position. As such, the pillar is an integral component of a vehicle door system, and directly effects the functionality of the vehicle door system. Particularly, since a vehicle door is typically mounted to a pillar, the stiffness characteristics of the pillar are critical to the performance of the door.

For example and without limitation, the stiffness of the pillar has a direct and significant effect on conventional door system performance measurements and/or criteria, such as door "drop-off", "sag", and "full open overload or twist" measurements. The stiffness characteristics of the pillar are especially critical to these measurements or criteria in certain localized regions of the pillar that are in relative close proximity to the mounting location of the door (e.g., regions around the hinge). Due to the effect that the stiffness of the pillar has on these performance criteria, efforts have been made to further strengthen or stiffen the pillar to allow a vehicle door system to meet and/or exceed its respective functional requirements.

Methods of strengthening and/or increasing the stiffness of these mounting structures or pillars typically include attaching or welding additional structures or members to the pillar or using additional (e.g., thicker or heavier gage) material to form or manufacture the pillar. These types of methods suffer from some drawbacks. For instance, the additional materials or structures used by these methods undesirably increase the overall weight and cost of the vehicle and adversely effect fuel economy. Furthermore, the determination of the precise locations in which the materials should be added is typically performed on a "trial and error" basis. This "trial and error" procedure requires a significant amount of time before yielding an optimized result, and may consume an excessive amount of material and/or prototypes.

There is therefore a need for a mounting structure and a method for increasing the stiffness of a mounting structure which overcomes the drawbacks of prior mounting structures and methods for increasing the stiffness of such mounting structures.

SUMMARY OF THE INVENTION

It is a first object of the present invention to provide a mounting structure and a method for increasing the stiffness of a mounting structure which overcomes some or all of the previously delineated drawbacks of prior methods and structures.

It is a second object of the present invention to provide a mounting structure having improved stiffness characteristics in certain localized areas which are critical to the performance of the mounting structure.

It is a third object of the present invention to provide a mounting structure which operatively supports a vehicle door, and which improves certain performance characteristics of the door.

It is a fourth object of the present invention to provide a method for increasing the stiffness of a mounting structure which does not undesirably increase the overall weight and cost of the mounting structure.

According to a first aspect of the present invention, a mounting structure is provided. The mounting structure includes a first region on which a component is selectively mounted and a bead which is integrally formed within the structure and which substantially circumscribes the region, the bead being effective to stiffen the mounting structure.

According to a second aspect of the present invention, a method is provided for increasing the stiffness of a mounting structure on which a component is selectively attached. The method includes the steps of determining a region on which the component is selectively mounted; and forming a continuous bead within the mounting structure and around the region, thereby increasing the stiffness of the mounting structure.

These and other features, aspects, and advantages of the present invention will become apparent by reading the following detailed description of the preferred embodiment of the invention and by reference to the following drawings.

DETAILED DESCRIPTION OF THE PREFERRED EMBODIMENT OF THE INVENTION

Figure 1:
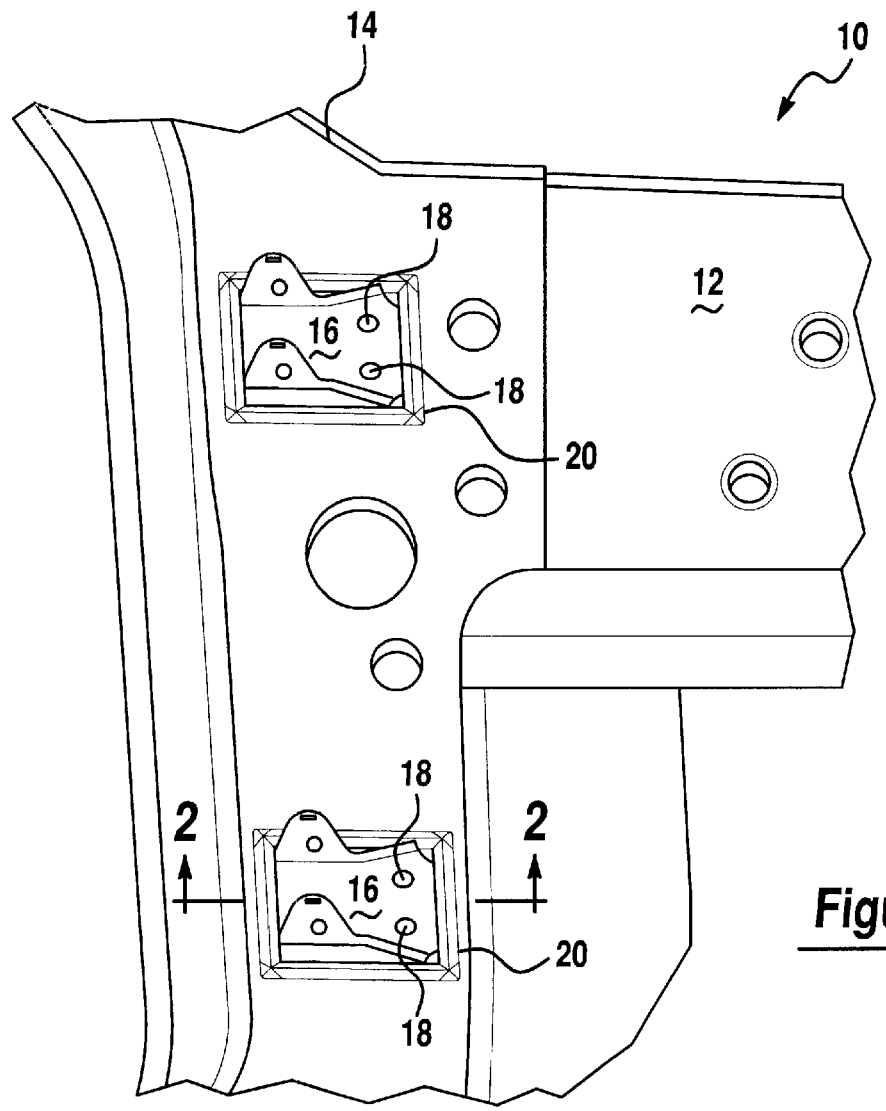
FIG. 1 is a perspective view of a mounting structure which is formed in accordance with the teachings of a preferred embodiment of the present invention.
Figure 2:
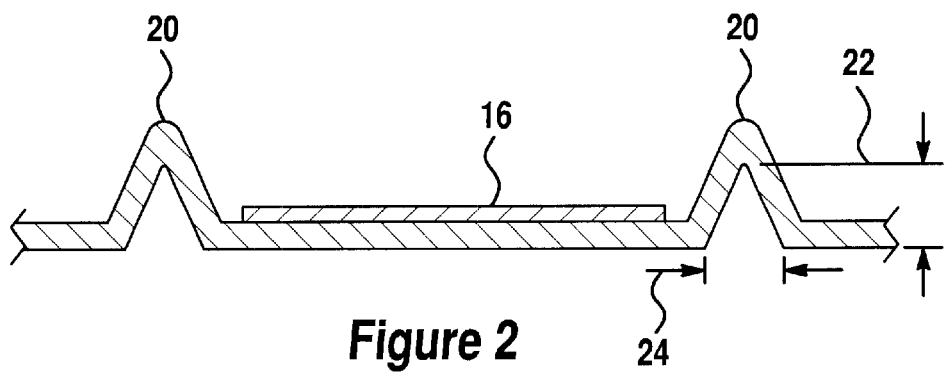
FIG. 2 is a partial sectional view of the mounting structure shown in FIG. 1 and taken along view line 2—2.

Referring now to FIGS. 1 and 2, there is shown a mounting structure, pillar or member 10 which is made in accordance with the teachings of the preferred embodiment of the invention. As shown best in FIG. 1, mounting structure 10 comprises a member or portion 14 of a conventional vehicle body 12, and may be used or employed in one non-limiting embodiment as an "A-Pillar" of vehicle body 12 on which a vehicle door (not shown) is selectively, conventionally, and operatively mounted. While the following discussion relates to the use of structure 10 as a "pillar" of vehicle body 12 on which a door is selectively mounted, it should be appreciated that structure 10 may be used in other applications to support various other objects or components and/or may be used in combination with other portions of a vehicle or virtually any other type of structure to which objects or components are selectively and desirably attached.

Structure 10 comprises a pillar or member 14 which is selectively and fixedly attached to vehicle body 12. In the preferred embodiment of the invention, member 14 is manufactured from a relatively strong and durable material, such as steel, and is attached to the vehicle body 12 in a conventional manner (e.g., by welding). In other alternate embodiments, member 14 may be integrally formed with vehicle body 12. In the preferred embodiment of the invention, member 14 comprises an "A-Pillar" of vehicle body 12.

Member 14 is adapted to operatively support a conventional vehicle door (not shown). Particularly, a vehicle door may be selectively and operatively mounted to member 14 by use of hinges, brackets, or members 16 which are fixedly attached to member 14 in a conventional manner, such as by use of conventional bolt type fasteners 18.

Structure 10 includes a pair of generally rectangular "closed loop" or continuous beads or protrusions 20 which are integrally formed within member 14 in a conventional manner, such as by use of a conventional punching or stamping process and which are found around members 16. Each bead or protrusion 20 circumscribes and/or surrounds a unique hinge or bracket member 16. In other non-limiting embodiments, beads 20 may have different shapes and configurations, which may, at least in part, be based upon the shape and size of the hinge or bracket member 16 which is used to mount the vehicle door to the pillar 14. As shown best in FIG. 2, bead 20 has a generally uniform and triangular shaped cross-section, having a height 22 and a width 24. In the preferred embodiment of the invention, height 22 and width 24 are each about 10–15 millimeters. In other alternate embodiments, bead 20 may have a different cross-sectional shape, size or configuration.

In the preferred embodiment, the shape, size and location of bead 20 is determined by the shape, size and location of the regions of pillar 14 which have the greatest effect and/or contribution to the stiffness characteristics of the door and the pillar 14. As illustrated in FIG. 1, these regions are generally localized around the portions of the pillar 14 to which the door is attached (i.e., around hinges 16). The shape, size and locations of the beads 20 are further determined and/or limited by the structure of the pillar 14 itself. For example and without limitation, a bead may be unduly difficult or tedious to form in certain portions of pillar 14, and therefore, beads 20 may be formed or shaped to avoid tedious or difficult formation procedures and to avoid major design changes and tooling costs.

Figures 3, 4:
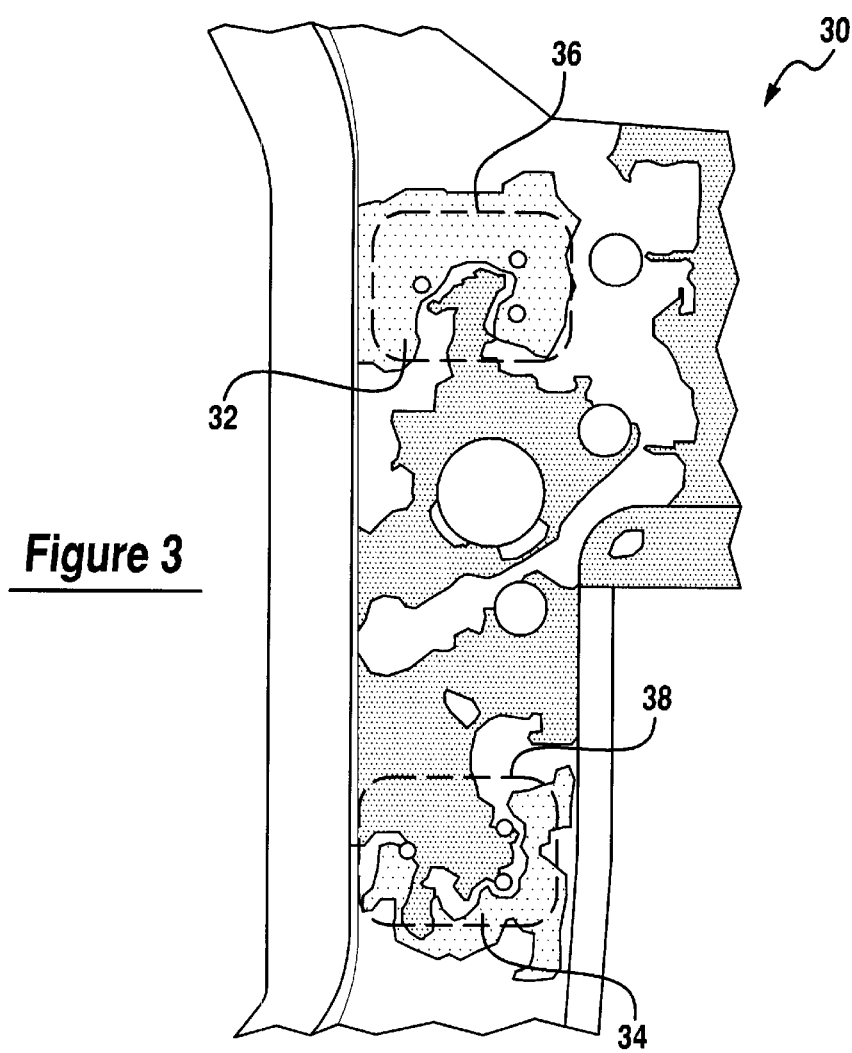
FIG. 3 is a computer generated model of a mounting structure similar to the mounting structure shown in FIG. 1 and which may be used to determine the location of the beads which are selectively formed within the mounting structure.
FIG. 4 is a table illustrating the improvement in performance criteria achieved by the mounting structure shown in FIG. 1 relative to other mounting structures.

In the preferred embodiment of the invention, conventional a computer aided engineering and/or modeling system is used to analyze the structure, stiffness, and/or rigidity of the various regions of pillar 14. In one non-limiting embodiment, the computer aided engineering system generates a model of the pillar 14 in which various regions of pillar 14 are given a particular shading (e.g., a particular color or texture) based upon their respective stiffness attributes and/or their respective contribution to the overall stiffness of the door system and/or pillar 14. In the preferred embodiment, the generated model is graphically and/or visually displayed to a user in a conventional manner, such as by use of a conventional monitor and/or printing device, and is employed by the user to determine the best location, size and shape of beads 20. An example of a model 30 which is selectively generated in one non-limiting embodiment is illustrated in FIG. 3. As shown in model 30, areas or regions 32, 34, which are located in relative close proximity to the mounting locations of brackets 16, are shaded in a certain manner (e.g., in a certain color or texture) effective to notify a user that regions 32, 34 are critical to or contribute substantially to the stiffness characteristics of pillar 14 and/or the vehicle door system. By examining and/or analyzing model 30, a user can then design or form a bead which will provide the greatest improvement in the stiffness of the pillar 14. In the preferred embodiment, the greatest stiffness improvements can be made by forming a continuous or "closed" loop bead 36, 38 around and/or substantially covering each region 32, 34. Particularly, the inventors have found that forming a continuous or "closed loop" bead substantially around or circumscribing each of these regions 32, 34 provides significant improvements in the performance or stiffness of pillar 14 over other types of formations (e.g., individual or disconnected beads).

Referring now to FIG. 4, there is shown a table 40 which illustrates the improvements in functional performance criteria or measurements of a vehicle door system which is selectively attached to a pillar (e.g., pillar 14) which is formed according to the teachings of the preferred embodiment of the present invention. Row 42 illustrates the performance measurements of a door which is mounted to a pillar having no beads; row 44 illustrates the performance measurements of a door which is mounted to a pillar having independent or disconnected horizontal beads (e.g., a horizontal bead formed above and below each hinge); and row 46 illustrates the performance measurements of a door which is mounted to a pillar having a "closed-loop" bead around each hinge member. As shown in column 48, the "drop off" at belt line measurement (e.g., the amount or distance that the door moves downward when it is open as a result of its own weight) is significantly improved in the system having closed loop beads (e.g., an 11% reduction relative to a pillar having no beads). As shown in column 50, the "sag" at belt line measurement (e.g., the amount or distance that the door moves downward when it is open as a result of a predetermined applied force) is significantly improved in the system having closed loop beads (e.g., an 11% reduction relative to a pillar with no beads). Finally, as shown in column 52, the "full open twist at tip-bottom" (e.g., the amount or distance that the door moves beyond its full open position as a result of a predetermined applied force) is also significantly improved in the system having closed loop beads (e.g., a 16.6% reduction relative to a pillar with no beads). Hence, a mounting structure formed according to the teachings of the preferred embodiment of the present invention has improved stiffness characteristics in critical areas, and achieves this improved stiffness without an increase in the overall weight or cost of the structure.

It is to be understood that the invention is not limited to the exact construction or method which has been previously delineated above, but that various changes and modifications may be made without departing from the spirit and the scope of the following claims.

What is claimed is:

1. A vehicle pillar having a first region on which a component is selectively mounted of a hinge which is coupled to said first region and a bead which is integrally formed from pillar and which substantially circumscribes said first region in substantially the same said hinge, said bead being effective to stiffen said pillar.

2. The pillar of claim 1 wherein said bead is substantially rectangular.

3. The pillar of claim 1 wherein said bead is substantially triangular cross-section.

4. The pillar of claim 1 wherein said component comprises a vehicle door.

5. A mounting structure for use with a vehicle having a body and a door, said mounting structure comprising:
- a pillar disposed upon said body;
- at least one first member which is coupled to said pillar and to said door, thereby connecting said door to said pillar; and
- at least one bead which is integrally formed from said pillar and around said at least one first member, and which is effective to stiffen said pillar.

6. The mounting structure of claim 5 wherein said at least one first member comprises a pair of hinges.

7. The mounting structure of claim 6 wherein said at least one bead comprises a pair of beads, each of which circumscribes a unique one of said pair hinges.

8. The mounting structure of claim 7 wherein each of said pair of beads is generally rectangular shaped.

9. The mounting structure of claim 8 wherein each of said pair of beads has a generally triangular cross-section.

10. The mounting structure of claim 9 wherein each of said pair of beads is formed by a stamping process.

11. A method for increasing the stiffness of a vehicle pillar member on which a component is selectively mounted, said method comprising the steps of:

- determining a region of said vehicular pillar member on which said component is selectively mounted; and
- forming a continuous bead from said vehicle pillar member and around said region, thereby increasing the stiffness of said vehicular pillar member.

12. The method of claim 11 wherein said component comprises a vehicle door.

13. The method of claim 12 further comprising the steps of:

- performing computer aided engineering analysis on said pillar member, effective to display portions of said pillar member which substantially contribute to the stiffness of said pillar; and
- determining a shape and a size of said bead based upon said computer engineering analysis.

14. The method of claim 13 wherein said portions of said pillar member which substantially contribute to the stiffness of said pillar are displayed in a certain color.

15. The method of claim 12 wherein said bead is generally rectangular shaped.

16. The method of claim 15 wherein said bead has a generally triangular cross-section.

* * * * *